United States Patent [19]

Salihi

[11] 4,456,097
[45] Jun. 26, 1984

[54] ELEVATOR BATTERY CHARGING CONTROL

[75] Inventor: Jalal T. Salihi, Manchester, Conn.

[73] Assignee: Otis Elevator Company, Farmington, Conn.

[21] Appl. No.: 434,014

[22] Filed: Oct. 12, 1982

[51] Int. Cl.[3] .......................... B66B 5/00; H02J 7/14
[52] U.S. Cl. ................................... 187/29 R; 320/13
[58] Field of Search .......................... 187/29; 318/139; 320/13, 51

[56] References Cited

U.S. PATENT DOCUMENTS

| | | | |
|---|---|---|---|
| 4,281,278 | 7/1981 | Bilsky et al. | 320/13 |
| 4,316,097 | 2/1982 | Reynolds | 187/29 R X |
| 4,325,010 | 4/1982 | Lowndes | 318/139 |
| 4,376,471 | 3/1983 | Uchino et al. | 187/29 R |
| 4,395,639 | 7/1983 | Bring | 320/13 X |
| 4,409,525 | 10/1983 | Hartwig | 318/139 |

Primary Examiner—G. Z. Rubinson
Assistant Examiner—W. E. Duncanson, Jr.
Attorney, Agent, or Firm—Robert E. Greenstien

[57] ABSTRACT

An elevator system is battery powered. The battery is charged by a battery charger and also regenerated by a polyphase motor which drives the car and which is inverter operated. The charge on the battery is controlled by sensing the battery voltage and, if the voltage is excessive for an interval of time, applying a load to the battery for an interval of time. The battery voltage may also be sensed by controlling the battery discharge in proportion to the excess voltage.

4 Claims, 5 Drawing Figures

ELEVATOR BATTERY CHARGING CONTROL

DESCRIPTION

1. Technical Field

This invention relates to elevators, in particular, controlling battery charging in elevators.

2. Background Art

It is well known that the speed and torque of a polyphase induction motor is a function of the frequency of the alternating power that is supplied to the motor and the voltage that is applied to the windings.

It is also well known that the motor can operate at either a synchronous speed, the same frequency as the power to it, and an asynchronous speed, higher or lower than that frequency. It operates at the synchronous speed when the motor is under no load and at the asynchronous speed when the motor is under load or being driven. The speed difference is known as slip, the magnitude of which dramatically impacts the motor's efficiency and performance.

Therefore, the typical polyphase motor is given requirements for maximum slip by the manufacturer, typically about ± Hz., depending on the motor design and whether it is motoring or regenerating, or braking. To develop maximum torque and maximize motor efficiency, the slip under load conditions should be held at that figure. For instance, if a two-pole motor is powered from a 60 Hz. source during motoring, the speed of rated torque would be about 3540 r.p.m., that being a positive slip of +1 Hz.

Following a converse concept, but using the same criteria, if the motor is moving at a speed which is greater than the frequency, power can be supplied from it or regenerated back to the source. The slip also should be maintained within those limits in this case. But, for regeneration or braking, the speed of the motor may be, for instance, 3660 at rated torque, in which the slip is −1 Hz., this being negative slip.

So, it is not surprising that many techniques have been tried to control slip precisely; however, most have met with less than desirable results because they are too costly, too complicated or do not provide good performance.

An elevator is one application in which slip control is particularly demanding because motor performance there must be superior to that in most other applications. For instance, for a comfortable ride the motor must be accelerated and decelerated smoothly, without vibration and noise; yet, for system speed it must be fast. It should also be efficient, which means it should regenerate power, and, naturally, it must be operated in such a way as to provide precise car positioning at the floors. Most important, the motor must often be operated at near zero speed, at which precise frequency control is critically important for smooth performance.

But, slip control is also very attractive for an elevator system, because a battery may be used to power an inverter which powers the elevator motor, and the slip may be controlled, by controlling the inverter, to charge the battery under regenerative conditions. The battery may be charged continuously. But, then, overcharging during regeneration should be avoided.

DISCLOSURE OF INVENTION

An object of the present invention is to control battery charging in a regenerative battery powered elevator system.

According to one aspect of the present invention, a motor is powered by a battery which is charged by a battery charger and the motor.

According to another aspect of the invention, the voltage is measured and if it is above a reference voltage for a preset interval, a load is applied to the battery for a preset interval and the voltage is again sensed after the load is removed. This operation takes place successively until the voltage is below the reference voltage.

According to another aspect of the invention, the voltage is sensed continuously, and its magnitude is used to control a duty cycle of a chopper that uses the battery to provide current to a resistive/inductive load in order to reduce the battery voltage.

BEST MODE FOR CARRYING OUT THE INVENTION

Figure 1:
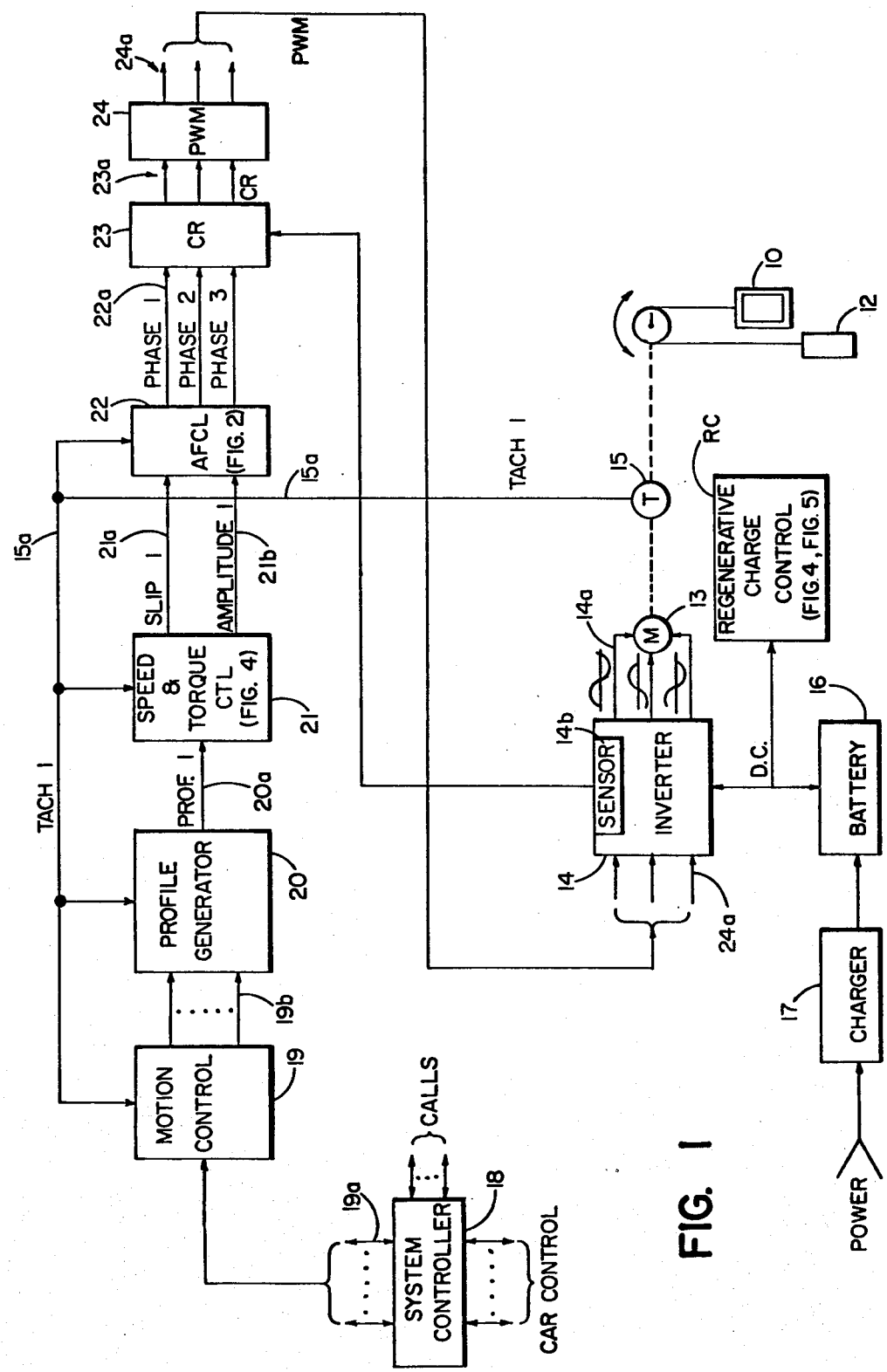
FIG. 1 is a block diagram of an elevator system which embodies the present invention, that system utilizing an inverter to drive a 3-phase motor, and that inverter being powered by a battery and controlled in accordance with the present invention.

FIG. 1 shows an elevator control system which includes a number of functional components that are well known and whose design is not critical to the invention. Hence, those components are not described in detail, except to the extent that is needed to describe the invention. These components include a motion controller, profile generator and speed and torque controller, and others identified in what follows.

In FIG. 1 an elevator car 10 is connected by a cable 11 to a counterweight 12. The car is connected to the phase induction motor 13 which receives 3-phase power from an inverter 14. The motor drives a tachometer 15 (shaft encoder) which produces a tachometer output, TACH 1 signal, on the line 15a, that signal reflecting the instantaneous speed of the motor. The inverter receives DC power from a battery 16, and the battery is charged by a charger 17 which is connected to a power source. The DC power may flow to and from the battery through the inverter. Power may flow to the battery by regeneration from the motor as a result of the motion of the car in one direction (e.g. down), and that, in addition to the charger, charges the battery. The battery provides most of the surge or peak power to the inverter, meaning that the system is virtually isolated from the power source, which eliminates one source of RFI and other electrical noises that can build up in the power system and disturb other equipment connected to it. A regenerative charge control RC senses the battery voltage and dissipates the charge if the voltage exceeds an acceptable level (more than 14.3 volts for a 12 volt battery).

A system controller 18 receives car controls and calls, and in response communicates with a motion controller 19 over a plurality of lines 19a. The motion controller sends signals from lines 19b to a profile generator 20 which, in a predetermined or programmed manner, establishes a particular motion or velocity profile for the elevator car to move in response to the motion control, this concept being shown in numerous patents. The profile generator provides an output, PROF 1 signal, on line 20 a which is supplied to a speed and torque control 21. This speed and torque control unit provides, in response to the PROF 1 signal, a first DC signal, SLIP 1 signal, on line 21a, the SLIP 1 signal reflecting a desired slip for the particular PROF 1 signal generated by the profile generator. The profile generator also provides, on line 21b, a second DC output, AMPLITUDE 1 signal, which represents the desired amplitude of current (or voltage) to the motor winding to move the car as desired.

The interrelationship between the SLIP 1 and AMPLITUDE 1 signals determine the torque and speed of the motor, and the interrelationship is established through feedback control, that control centering on sensing the TACH 1 signal, supplied from the tachometer, and supplying it to the motion controller, the profile generator, the speed and torque controller, which use it to generate their respective signals, and the SLIP 1 and AMPLITUDE 1 signals to obtain a desired motor performance characteristic at any instant to control the car motion as required.

The TACH 1 signal is also supplied to an amplitude and frequency control circuit (AFCL) 22 which also receives the SLIP 1 and AMPLITUDE 1 signal. The AFCL circuit uses those signals to generate PHASE 1, 2, 3 signals over the three output lines 22a, each of those signals comprising a staircase sine wave of high resolution, whose magnitude is varied in a selected relation to the AMPLITUDE 1 signal in order to control the car motion in a certain manner. The signals (PHASE 1-3) are phased apart as required by the phase of the motor (e.g. 0, 120, 240, for a 3-phase motor, the example shows), and their frequency reflects the desired motor speed and slip for a selected SLIP 1 signal. Their magnitude reflects desired motor current, that being controlled by the AMPLITUDE 1 signal.

These PHASE 1-3 signals that comprise the AFCL output are supplied to a current regulator (CR) 23, which then produces output CR signals, also sine waves, on its output lines 23a, these signals being provided to a pulse width modulator (PWM) 24. The PWM supplies corresponding output signals, PWM signals, each signal comprising a pulse whose duration varies in proportion to the magnitude of its corresponding CR signal. The PWM signals are supplied to the inverter on line 24a. The current regulator provides closed loop control of the motor current to ensure that it accurately tracks the PHASE 1-3 signals. This type of control is well known in the field.

The PWM signals that are supplied from the PWM to the inverter turn separate sections or portions of the inverter on and off in direct proportion to the duration of the pulses in the PWM signal. The inverter turns the battery voltage on and off in proportion to the duration of the pulses that comprise the PWM signals, that voltage being applied on the lines 14a to the motor windings. Because the duration of those pulses that drive the inverter are interrelated in a sinusoidal fashion by the AFCL circuit, the average values of the pulses on the inverter output are sinusoidal also. But, even though the output signal on each of the lines 14a from the inverter comprises voltage pulses, the inductive characteristics of the motor result in a sinusoidal current (I) through the motor over each of the lines 14a, the frequency of that current being the primary frequency of the PHASE 1, 2, 3 signals. The harmonics are dramatically suppressed due to the motor's inductance, and, hence, the inverter provides, in effect, sinusoidal 3-phase current to the motor, that current being in response to digital pulses that reflect the current's frequency, magnitude and the phase relationship among the motor's windings. This current I is adjustable in its frequency and its magnitude, through which the motor speed, torque and slip are controlled. This adjustment is accomplished through the AFCL circuit 22, the detailed description of which follows.

Figure 2:
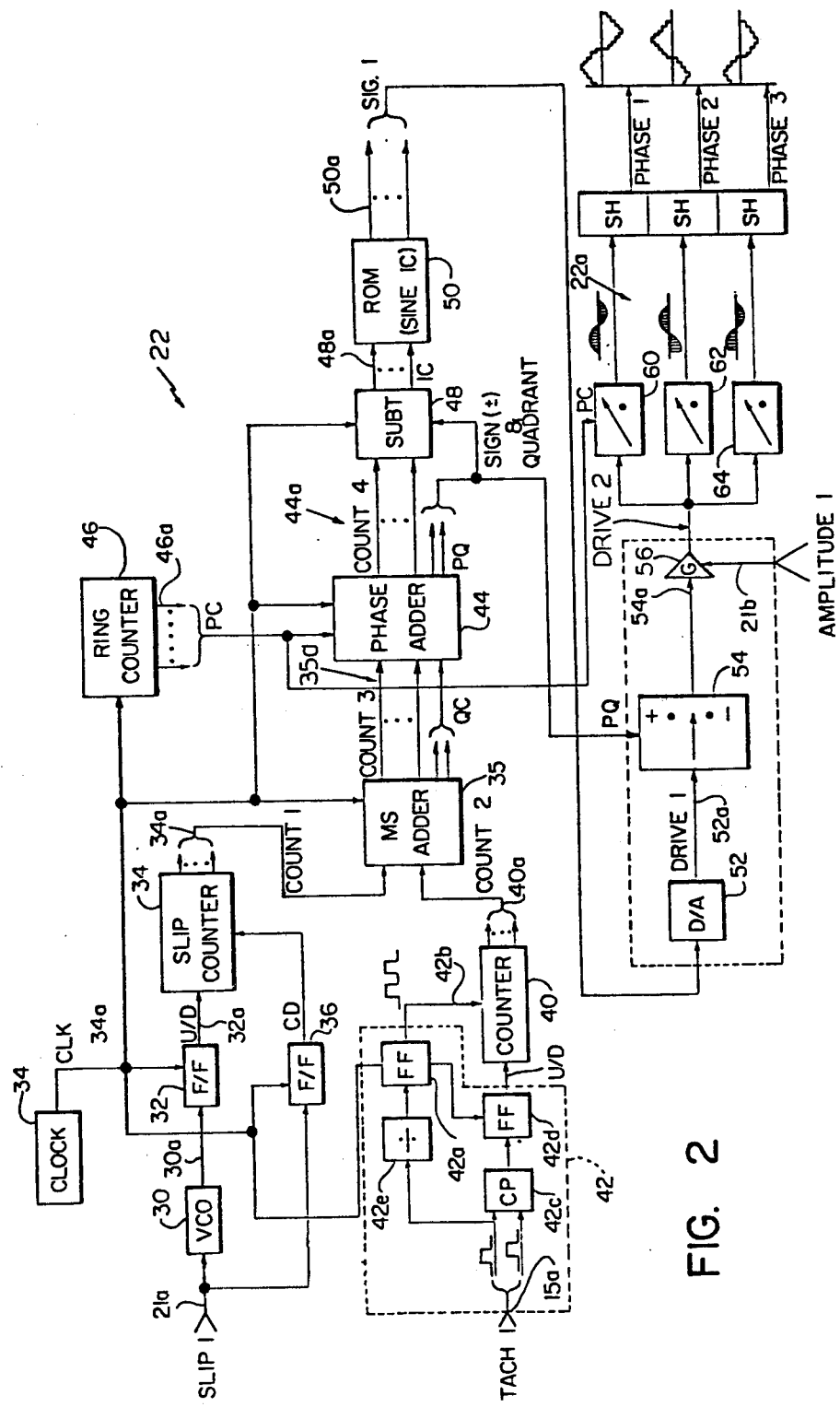
FIG. 2 is a block diagram of an amplitude and frequency control (AFCL) that is used in the system in FIG. 1 to drive the inverter to obtain slip, torque and speed control.

FIG. 2 shows the AFCL circuit 22. The AFCL circuit receives the SLIP 1 signal and also the AMPLITUDE 1 signal. The SLIP 1 signal is applied to a voltage controlled oscillator (VCO) 30 which produces an output VCO signal, on line 30a. The VCO signal, which is supplied to a flip-flop 32, consists of a string of pulses whose frequency (VCO frequency) F1 varies in proportion to the DC level of the SLIP 1 signal, which can be adjusted between predetermined positive and negative values, those levels defining a motor speed range, over which the frequency of the VCO may vary to control motor slip.

The flip-flop 32 also receives a CLK output signal from a clock 34; that signal strobes the signal from the VCO to the flip-flop output, producing a flip-flop output signal, also a string of pulses at F1, which are supplied over line 32a to a SLIP counter 33; it counts those pulses. The slip counter continually counts up, and on reaching its maximum count (e.g. N bits) starts over. So, its output is actually a signal, COUNT 1, reflecting the count at any instant.

Figure 3:
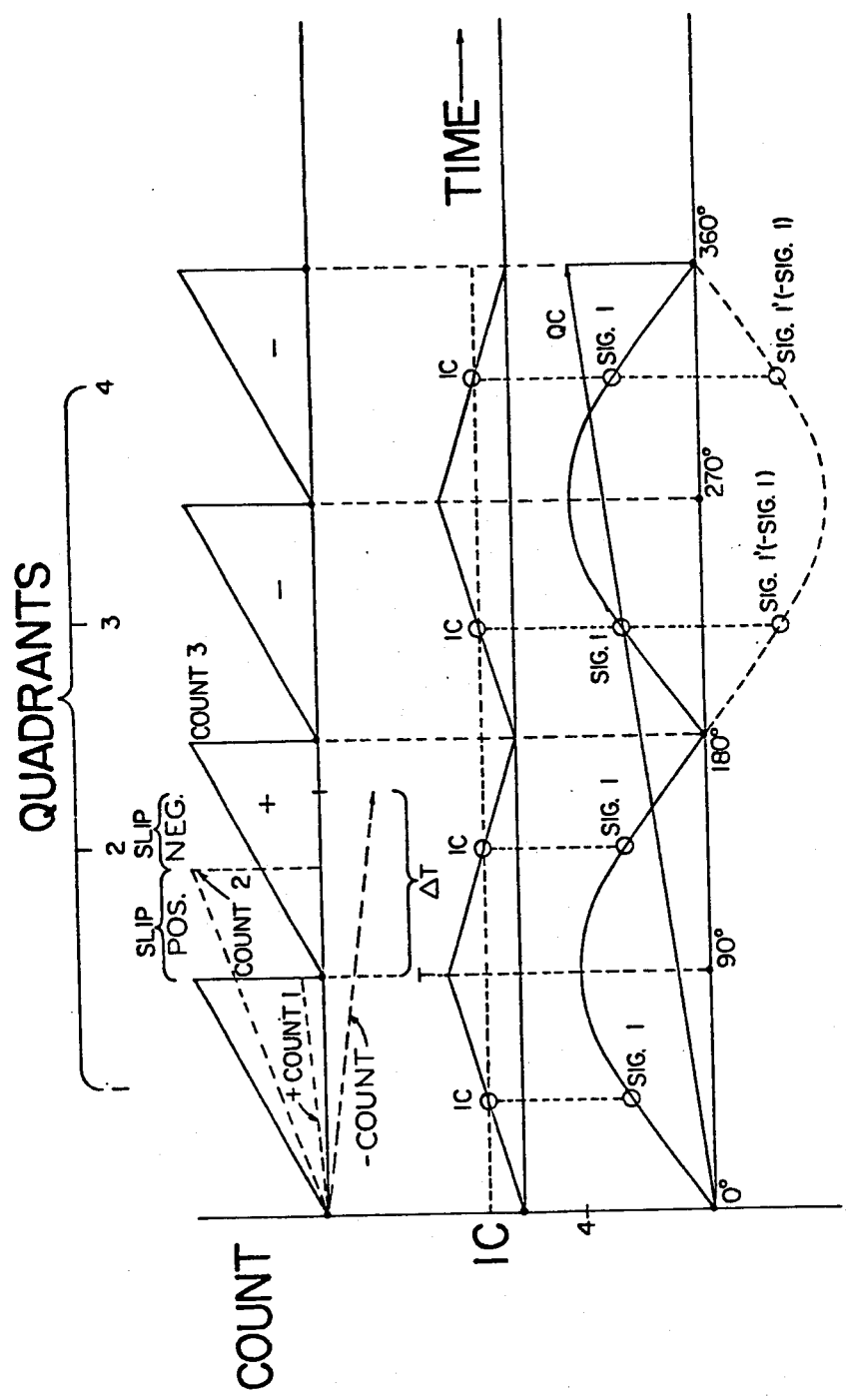
FIG. 3 consists of several waveforms that are in a common time base.

FIG. 3 shows this type of recurring count over time, the Y coordinate there representing the digital output or COUNT 1, the X-coordinate time. The SLIP 1 signal is also supplied to a second flip-flop 36. Also strobed by the CLK signal, this flip-flop is responsive to the polarity of the SLIP 1 signal, changing state from high to low depending on that polarity in order to provide a count direction signal, CD signal, that commands the SLIP counter to count up or to count down. COUNT 1, from the SLIP counter, is supplied on lines 34a to a motor speed (MS) adder 38, which also receives the output from another counter, speed (SPEED) counter 40, over the lines 40a.

The SPEED counter receives the output from a circuit 42 which includes a flip-flop 42A. This flip-flop 42A provides on its output lines 42B a train of square wave pulses. These are provided in response to the output from a divider circuit 42E which receives the TACH signal that is supplied on the line 15a. That line actually comprises two lines, each of which provide a square wave pulse relative to each other, the pulses on these lines being in quadrature (90° apart).

The divider circuit 42E receives the square wave pulses on one of these lines and provides, as its output, trigger pulses which are at a repetition rate that is equal to or lower then the repetition rate of the square wave pulses provided to its input. The output from the flip-flop 42 is provided to the input of the SPEED counter 40.

Both of the signals that comprise the TACH signal are also supplied to a comparator circuit 42C, and this circuit produces, in response, an output signal, which, depending upon the relationship between those two pulses (i.e. which one leads, which one lags), represents the direction in which the motor is turning. The output from the comparator 42C is then supplied to a flip-flop 42D, which, in response, produces an output signal which is either high or low. This signal is supplied to the count control terminal on the counter 40 to command it to count up or count down the pulses from the flip-flop 42A, depending on whether the signal is high or low. Just like the SLIP counter, the SPEED counter also continuously counts up, resets, and then counts up again. It can also count down depending on the output from the flip-flop 42D. The result is an output signal, COUNT 2, from the counter 40. This signal is also shown in FIG. 2. The repetition rate for COUNT 2 is F2, which is in proportion to the motor speed, since they are generated from the motor's rotation. The pulses that comprise the TACH 1 signal are generated very rapidly during each rotation of the motor, the effect of this being that the rotational position is resolved very precisely. The purpose for the divider then becomes correlating that count to the driving frequency of the motor, which is necessary in order to take into account the number of poles in the motor, since the number of poles determines the speed of the motor. This correlation is important because the repetition rate F2 should correspond to the driving frequency. For example, comparing a four-pole and two-pole motor, the shaft position in the four-pole motor must be resolved so that the COUNT 2 is produced more rapidly per revolution. Hence, the TACH signal must be divided by two for a two-pole motor, otherwise F2 would be too high—the motor would not be synchronized within the slip range. (This assumes that the same tachometer is used, further, the count/revolution would be the same regardless of motor speed.) The reason for this will become even more apparent from the remaining portions of this description, which will show that from the basic frequency F2, a higher or lower frequency is established from the COUNT 1 signal in order to vary the driving frequency from that of the actual motor speed, this being done in order to control slip.

The MS adder adds COUNT 1 and COUNT 2, producing at its output lines 35a, an output COUNT 3 which is the sum of the two. The effect of adding COUNT 1 and COUNT 2 is to shorten the time it takes to obtain a particular COUNT 3, and thus shorten T in FIG. 3. In other words, as the SLIP counter counts up, the slope of waveform A will increase because T becomes less. As it counts slower, the slope will be less because T will increase. So, by changing the VCO frequency, T can be increased and decreased in proportion to COUNT 1, that range being the SLIP RANGE or Δt, that defining a change in frequency between F1, the frequency of COUNT 1, and F2, the frequency of COUNT 2.

As explained later in detail, to maintain a certain slip, COUNT 1 is controlled to be higher or lower than COUNT 2 by an amount that equals the slip that is desired (e.g. specified for the motor). The overall action of the AFCL circuit on the motor's operation is represented by this equation (1).

$$F\ SYNCH = \pm F(MOTOR) \pm F(SLIP) \quad (1)$$

Here, F SYNCH is also the frequency (F3) of the PHASE 1-3 signals, which is the inverter driving frequency. FM is the motor speed and COUNT 2 is a function of it, but may be ± depending on the direction of rotation, because COUNT 2 can be a down count or up count. F SLIP, the same as the VCO frequency, may be ± depending on the SLIP signal, which may be ± to effect ± slip. Thus, a smooth transition between motor functions is obtained, which is important for leveling at "close speed" (near zero speed).

In addition to COUNT 3, the adder 35 also provides a digital output, QC signal, which is a representation of the number (0–4) of cycles made by the COUNT 2. Each cycle is a quadrant, representing 90° in a full cycle of 360°. To do this, the MS adder output may have N bits, but actually use N-X bits for COUNT 3, and the remainder of the N bits for indicating the quadrant and the sign of the sine curve in that quadrant.

COUNT 3, from the MS adder, is supplied to a second adder, the PHASE adder 44. The PHASE adder 44 also receives, on the lines 46a, a phase identification (PC) signal, from a ring counter 46, that signal being provided in response to the CLK signal. The PC signal identifies, at any instant in time, one of the desired phases, i.e. windings (e.g. 0°, 120°, 240°). This PC is a number which, if added to COUNT 3, would reflect what would be COUNT 3 at the phase; that is, a phase shifted by some amount reflected in the PC signal. In other words, the ring counter continually provides a "circulating digital" number which, when added to COUNT 3, reflects a count for one of the phases. The PC signal is also added with the QC signal in the PHASE adder, producing a PQ signal that represents the right quadrant for the phase for the PC signal, since the quadrant may be different for a different phase. Thus, the output from the PHASE adder 44 includes (1) an instantaneous digital representation, COUNT 4, of the count for a particular point X or counts for one phase, and (2) a digital representation of the quadrant for the PQ signal and its sign.

COUNT 4 represents the coordinate for any point on the SINE curve in FIG. 3, but only between 0°-90°. From the two, the proper point on the SINE curve for that coordinate is generated at any instant. This is done in the AFCL circuit for each phase, each time the PC signal changes, which occurs at the CLK rate.

COUNT 4 and the PQ signal are supplied to a subtractor unit 48, over the lines 44a. In response to the PQ signal, the subtractor provides an output, the IC signal, which is the proper coordinate value for the quadrant indicated in the PQ signal for COUNT 3. The subtractor counts down from the COUNT 4 signal for other quadrants during the presence of a PQ signal identifying that quadrant which, if not present, inactuates the subtractor. Then, it can be seen that the effect of the PC signal is to shift the IC signal between 0°, 120° and 240°.

The IC signal from the subtractor is a coordinate (e.g. X), and it is furnished on lines 48a to a lookup table, ROM 50. That IC signal addresses a particular number in the lookup table, that number corresponding to the sine value for a point on the SINE curve between 0°-90°. The ROM thus produces, on its output lines 50a, a digital output, SIG 1, that is the sine value for the coordinate identified by COUNT 3, but still uncorrected for the polarity for its quadrant. The SIG 1 signal is supplied to a digital to analog (D/A) converter 52 which produces an analog output, DRIVE 1 signal, on line 32a. This DRIVE 1 signal is supplied to a switch circuit 54, which also receives the PQ signal and, depending on what quadrant that identifier identifies, switches the DRIVE 1 signal between a positive or negative value, which gives the DRIVE 1 signal the right polarity for the quadrant. For example, the SIG 1 signal (so also DRIVE 1) would be negative in quadrants 3 and 4, as shown by the broken sine curve containing SIG 1' (SIG 1' being SIG 1 on the true sine curve). Thus a full sine curve is generated through the four quadrants shown over time - as different SIG 1 signals are provided and given the right polarity.

From the switch circuit the DRIVE 1 signal is supplied on line 54a to an amplifier (G) 56, whose gain is controlled in response to the magnitude of the AMPLITUDE 1 signal, in order to produce an output, DRIVE 2, whose magnitude is proportional to the AMPLITUDE 1 signal. This DRIVE 2 output signal is simultaneously supplied to three switches 60, 62, 64, each one corresponding to one phase drive of the inverter, each providing one of the PHASE 1, 2, 3 signals. These three switches receive the PC signal from the ring counter 46, that signal identifying the phase for the DRIVE 2 signal, and, depending on what that signal is, one of these switches is actuated, which transfers the DRIVE 2 signal to correct one of the sample and hold circuits 55, which produces a staircase sine signal over time - as the DRIVE 2 signal is generated. The SH outputs are the PHASE 1, PHASE 2 and PHASE 3 signals. The PHASE 1, PHASE 2, PHASE 3 signals are thus phased according to the PC signal and are at a common frequency, F SYNCH (see equation 1).

To demonstrate this slip control, this example is provided. Assume a two-pole AC motor at 3600 r.p.m., that is, driven by variable frequency drive using the invention; what are the frequencies of the VCO output (F1) and TACH signals and slip characteristics required for, (Case 1) zero torque; (Case 2) positive driving torque; and (Case 3) negative regeneration or braking using a constant AMPLITUDE 1 signal.

Case 1:
  FM = 60 Hz.
  F SLIP = 0
  F SYNCH = 60 Hz.
  VCO frequency = 0
  TACH frequency = 1024 pulses/second
Case 2:
  FM = 60 Hz.
  F SLIP = +1 Hz.
  F SYNCH = 61 Hz.
  VCO frequency = +170
  TACH frequency = 1024 pulses/second
Case 3:
  FM = 60 Hz.
  F SLIP = −1 Hz.
  F SYNCH = 59 Hz.
  VCO frequency = −170
  TACH frequency = 1024 pulses/second Hence, with this system the car can be moved from zero to full speed at a controlled rate and with a controllable slip, by controlling the SLIP 1 and AMPLITUDE 1 signals.

Figure 4:
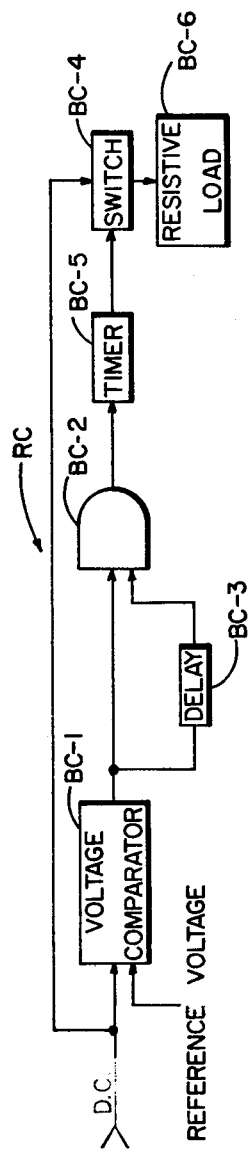
FIG. 4 shows one regenerative charge control embracing the invention.
Figure 5:
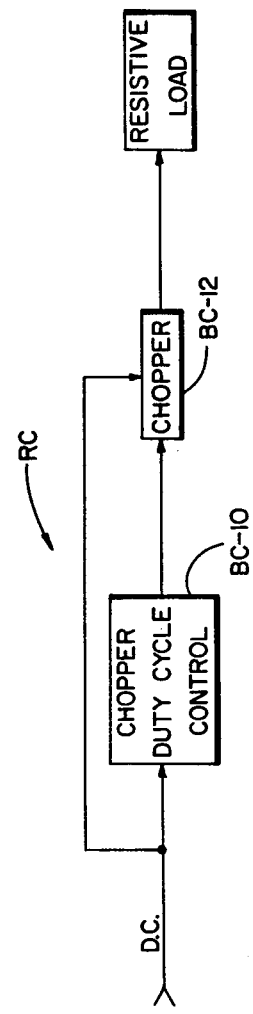
FIG. 5 shows another regenerative charge control embracing the invention.

FIG. 4 shows one battery charge control according to the present invention (FIG. 5 shows another). The battery voltage, D.C., is provided to one input of a voltage comparator BC-1, where it is compared with a reference voltage on the other input. The reference voltage is chosen to be the voltage beyond which the battery is excessively charged and further charging would cause damage. (Typically, this is 14.3 volts.) It should be greater than the charger voltage to avoid interference with charger operation. When the battery voltage exceeds the reference voltage, the comparator operates to produce a first signal, the TR1 signal, which is supplied to one input of a gate BC-2. The TR1 signal is gated to the gate output, as the TR2 signal, when a control signal, the CTL signal, appears on the other gate input. The CTL signal is provided from a time delay (e.g. about one second) circuit BC-3, which is triggered by the TR1 signal. The delay filters out voltage spikes. When the TR2 signal is provided, it fires a preset timer BC-3 (e.g. about one second) and the timer output, the TR3 signal, operates a switch BC-4 to connect the battery to a resistive load BC-6, causing current to flow through the resistive load, thereby dissipating a portion of the charge. Once the timer resets, the process repeats until the voltage comparator BC-1 does not fire, because the D.C. signal level does not exceed the reference voltage. In this manner, the battery voltage is sensed without placing the resistive load continuously across the battery, which would deteriorate regeneration. Battery charge control is thus very precise.

The alternative embodiment in FIG. 5 is different. The D.C. signal, the battery voltage, controls a chopper duty cycle control BC-10. This chopper duty control senses or measures the difference between the magnitude of the D.C. signal and the reference voltage (which is internallly generated) to provide an output signal, the CH1 signal, whose magnitude is proportional to the overcharge voltage. The CH1 signal is provided to the input of a chopper BC-12, which provides chopped current from the battery to a resistive load. The CH1 signal varies the duty cycle (on/off ratio) of that current in proportion to the magnitude of the CH1 signal. Thus, as the overvoltage increases, the duty cycle will increase, increasing the current in the resistive load, and thereby increasing the power dissipation. As the voltage decreases, the opposite occurs. This arrangement provides, in this fashion, a continuous proportional overvoltage control. Chopper circuits are, of course, well known for such applications as motor speed controls.

Another way to control the charge is to control the slip during regeneration to increase the motor losses.

Various modifications, variations, such as computer equivalents, for the invention have been shown, described or discussed. In addition to these, for one skilled in the art, other modifications and variations can be made without departing from the true scope and spirit of the invention.

I claim:
1. An elevator comprising:
   a battery,
   a car,
   a motor powered by the battery for propelling the car,
   a motor control for controlling motor operation to charge the battery under certain car motion conditions,
   characterized by:
   a power dissipating load,
   means for sensing the battery voltage and applying a load to the battery for a first interval of time if the voltage exceeds a predetermined level for a second interval of time in repeated succession.

2. An elevator according to claim 1, characterized in that the means for sensing the battery voltage comprises:
   means for providing a first signal when the battery voltage exceeds the predetermined level,
   means for gating said first signal upon the expiration of the second interval of time to provide a second signal,
   a timer operable in response to said second signal to provide a third signal for said to provide a third signal for said first interval, and
   a switch operable in response to a third signal for connecting the load across the battery.

3. An elevator according to claim 1, characterized in that said means for sensing battery voltage comprises:
   a chopper circuit for providing power from the battery to said load,
   means for providing a first signal to said chopper circuit, the duty cycle of said chopper circuit being proportional to the magnitude of said first signal, said magnitude being proportional to the excess battery voltage, and
   said load is resistive.

4. An elevator according to claim 1, characterized in that:
   said motor is a polyphase motor,
   said motor control includes a variable frequency drive for providing power to said motor,
   the elevator includes a battery charger for separately charging the battery irrespective of car operation.

* * * * *